US005498462A

United States Patent [19]
Darfler

[11] Patent Number: 5,498,462
[45] Date of Patent: Mar. 12, 1996

[54] HIGH THERMAL CONDUCTIVITY NON-METALLIC HONEYCOMB

[75] Inventor: Stephen C. Darfler, Castro Valley, Calif.

[73] Assignee: Hexcel Corporation, Pleasanton, Calif.

[21] Appl. No.: 221,833

[22] Filed: Apr. 1, 1994

[51] Int. Cl.⁶ ..................................................... B32B 3/12
[52] U.S. Cl. .................... 428/116; 52/784.14; 52/793.1; 428/118; 428/367; 428/902
[58] Field of Search ............................. 428/73, 116, 117, 428/118, 367, 902; 52/806, 784.14, 793.1

[56] References Cited

U.S. PATENT DOCUMENTS

| | | | |
|---|---|---|---|
| 3,404,748 | 10/1968 | Bjorksten | 428/12 X |
| 4,204,016 | 5/1980 | Chavannes | 428/108 |
| 4,409,274 | 10/1983 | Chaplin et al. | 428/112 |
| 4,440,819 | 4/1984 | Rosser et al. | 428/107 |
| 4,504,343 | 3/1985 | Green | 156/177 |
| 4,568,593 | 2/1986 | Green | 428/110 |
| 4,628,001 | 12/1986 | Sasaki et al. | 428/367 |
| 5,021,283 | 6/1991 | Takenaka et al. | 428/118 X |
| 5,030,305 | 7/1991 | Fell | 156/197 |
| 5,114,775 | 5/1992 | Gsell et al. | 428/107 |
| 5,139,596 | 8/1992 | Fell | 428/116 X |
| 5,171,620 | 12/1992 | Gotoh et al. | 428/116 |
| 5,288,537 | 2/1994 | Corden | 429/902 X |

*Primary Examiner*—Henry F. Epstein
*Attorney, Agent, or Firm*—Poms, Smith, Lande & Rose

[57] ABSTRACT

Thermally conductive non-metallic honeycomb structures are provided as well as a novel co-corrugation process for their production. The thermal conductivity of the non-metallic honeycomb structures is increased by incorporating unidirectional thermally conductive fibers in the corrugated laminate sheets used to form the honeycomb. Thermally conductive fibers are integrated in the laminate sheets as a unidirectional fiber prepreg which minimizes the number of broken fibers and allows controlled directional heat conductance through the honeycomb structure.

7 Claims, 2 Drawing Sheets

HIGH THERMAL CONDUCTIVITY NON-METALLIC HONEYCOMB

BACKGROUND OF THE INVENTION

1. Field of the Invention

The present invention relates generally to the production of non-metallic honeycomb structures for use in situations where high thermal conductivity through the structure is required. More particularly, the present invention relates to a novel and improved corrugation process for producing thermally conductive honeycomb structures from non-metallic composite materials and products thereof.

2. Description of Related Art

Honeycomb shaped materials have long been used to increase the relative stiffness and strength of a structure without imposing a corresponding increase in weight. In particular, honeycomb structures have been incorporated as core materials in sandwich constructions having dense, high strength facings. Such structures provide the highest stiffness to weight ratio of any common materials design. Accordingly, these lightweight constructs are widely used in military and commercial aircraft, automotive bodies, engine components, recreational equipment, marine craft, support structures and cargo containers.

Honeycomb core materials are products consisting of thin sheets which are attached in such a way that numerous cells are formed. While various honeycomb configurations have been employed for different purposes, most honeycomb structures consist of a nested array of hexagonal cells which tend to provide the best characteristics overall. Along with cell configuration, the properties of a honeycomb core are largely determined by cell density and the material of manufacture. Higher cell density leads to better mechanical properties of a piece, but at the cost of increased weight. However, weight limitations and other problems can often be alleviated by the selection of appropriate materials.

The search for structural materials with desirable properties has resulted in the extensive development of non-metallic composite materials for honeycomb structures due to their light weight and anti-corrosive properties compared to metallic honeycomb structures. Composites are materials in which two or more distinct substances such as glasses, ceramics, or polymers are combined to produce a material with structural or functional characteristics different from the individual constituents. The constituents retain their individual characteristics and are distinguishable on a microscopic scale. Typically one constituent is classified as the reinforcement and the other as the matrix. The reinforcement generally provides the strength or stiffness in the composite while the matrix binds the reinforcement together and contributes to the distribution of the load.

Generally two major classes of polymers are employed in composite materials and may be classified as thermosetting and thermoplastic. The principal differences between the two polymer classes is the degree of crosslinking and response to elevated temperature. Thermosetting resins or polymers are extensively crosslinked and undergo irreversible changes when heated or reacted with a selected catalyst or a curing agent. Examples of important thermoset matrix materials are polyesters, epoxies, polyimides and phenolics. In contrast, thermoplastic materials are generally not crosslinked and soften as they are heated. After being exposed to heat they return to their original condition when cooled below their melt temperature. Common thermoplastic materials include polyolefins, vinyls, polyamides, acrylics, polycarbonates, and polysulfones.

Thermoplastic systems have advantages over some of the thermosets in that no chemical reactions which cause release of gas products or excess thermal heat are involved. Further, they are generally more ductile and tougher than thermosets. Processing is limited only by the time needed to heat, shape, and cool the structure. In contrast, thermoset resins undergo an irreversible chemical reaction or cure in the presence of a catalyst, heat, radiation and/or pressure. Once cured they cannot be returned to the uncured state and can no longer flow. However, they tend to exhibit better chemical resistance, adhesion and superior electrical characteristics when compared to thermoplastics. While thermosets have traditionally been the principal matrix for composites due to their relative ease of handling and processing as well as low unit cost, thermoplastic matrices are becoming more popular for a number of applications due to new formulations. For example some high performance thermoplastics now equal the most common thermosets in temperature capability.

Similarly, advances in the mechanical properties of reinforcement materials have expanded the use of composites in honeycomb fabrication. Selection of the type and form of reinforcement will vary in accordance with the design requirements for the structure. General criteria for a desirable reinforcement include high strength, high modulus, low weight, low cost, ease of fabrication and environmental resistance. Common materials having some or all of these properties and useful for fabricating reinforcements are glasses, polymers, ceramics and graphite each of which may come in many different forms. Widely used forms of reinforcements include continuous fibers or filaments, chopped fibers, mats, woven fibers, particles or ribbons. While different forms of reinforcement are used in different applications, fibers have been used most extensively for the development of advanced composites as they provide the highest strength and modulus per unit weight. Moreover they may be woven, chopped or used as mats depending on the desired properties of the structure.

In any case, honeycomb structures are typically manufactured using an expansion process or a corrugation process depending on the nature of the material employed and the cell configuration desired. In the expansion process sheets of the desired reinforcement material are cut to the desired shape and strips of adhesive are applied. Quite often the adhesive material is actually printed on the sheet material before cutting. The cut material is then stacked in layers and bonded at the selected adhesive points. Usually the alternate sheets have the position of the applied adhesive staggered to provide the correct shape upon expansion. The bonded stackup is then cut to the desired configuration and mechanically expanded. In non-metallic honeycomb the expanded stackup is often impregnated with a thermoplastic or thermoset matrix and cured to retain this configuration. The corrugation process for manufacturing non-metallic honeycomb often involves the use of sheet-like preimpregnated reinforcement material (prepreg). Prepregs are obtained by impregnating fiber, fabric or paper reinforcement material with a thermoplastic or thermoset matrix. In one example of this method the single or multi-ply prepreg material is passed through mated corrugating rollers to form a corrugated sheet. Other methods, such as vacuum formation or pressure molding, may also be used to fabricate these structures. The corrugated sheets are then stacked and aligned to form a honeycomb arrangement and cured or otherwise bonded to one another at the appropriate nodes to form a honeycomb panel.

The use of corrugation techniques to produce honeycomb structures is well known in the art. For instance, U.S. Pat. No. 5,030,305 (withdrawn) describes a method of manufacturing reinforced thermoplastic honeycomb structures. The fiber reinforcement may be in the form of a woven or nonwoven web which is corrugated using vacuum, molding or roller methodology. Thermoplastic resin may be introduced in the form of staple fibers blended into the nonwoven web, by melt coating the web, or by laminating a preformed thermoplastic resin film to the web. The sheets thus formed may be stacked and heated at selected points to produce the desired honeycomb structure.

Honeycomb structures formed of thermoplastic and thermoset composite materials are particularly attractive in light of their ease of manufacture and inherent physical properties. For example, fiberglass honeycomb materials have been in use for more than forty years as cores for radomes and antenna windows due to their beneficial electrical characteristics. Similarly, in addition to low weight and high strength, non-metallic honeycomb structures often act as good thermal insulators and are frequently used in this capacity by industry. In particular carbon-carbon and carbon-phenolic materials have been developed for thermal protection systems. One important use for these materials is in the leading surfaces of aircraft which are subjected to high aerodynamic heating loads due to atmospheric friction. The use of insulating honeycomb structures with dead air spaces allows the heat to gradually dissipate without adversely affecting the interior environment of the aircraft.

While the insulating properties of non-metallic honeycombs are desirable in many instances, there are situations where it is advantageous to have high strength, lightweight materials which have a high thermal conductivity. For example, jet aircraft engines require a high degree of thermal transfer through the engine structure in order to maintain structural temperature loads at acceptable levels. Accordingly, the engine structure from the combustion chamber to the outer nacelle must function as a thermally conductive heat sink while still being extremely strong and lightweight.

Prior art honeycomb structures made from aluminum have been shown to have the required strength along with sufficient thermal conductivity to allow the necessary transfer of heat from the core flow path to the fan bypass flow path or in nacelle and/or thrust reverser structures. However, aluminum is subject to corrosion, thermal expansion and associated stress problems. To avoid these complications, various glass fiber reinforced composite honeycomb structures and polyacrylonitrile (PAN) based carbon fiber reinforced composite materials have been suggested as potential substitutes for the aluminum honeycomb structures in jet aircraft engines. However, such non-metallic honeycomb structures are generally not suitable due to their poor thermal conductivity.

One solution to this problem of low thermal conductivity in non-metallic honeycomb structures has been advanced in U.S. Pat. No. 5,288,537 which is owned by the same assignee as this invention and which is incorporated herein by reference. The application provides a strong, lightweight, nonmetallic honeycomb structure exhibiting a high degree of thermal conductivity. These novel honeycomb structures were based on the surprising discovery that highly conductive pitch based carbon fibers could be woven into nonmetallic composite reinforcement materials to provide the desired levels of thermal conductivity. As the conductive carbon fibers can be integrated with a variety of woven reinforcement materials having different properties, thermally conductive honeycomb structures may be designed and fabricated to exhibit the desired mechanical characteristics.

More specifically the walls of the thermally conductive honeycomb include a plurality of non-metallic fibers having low thermal conductivity in combination with a plurality of non-metallic fibers having high thermal conductivity. Both sets of interwoven fibers are impregnated in a resin matrix which is then used to fabricate honeycomb structures using conventional production techniques. The disclosure further specifies that the thermally conductive fibers may be incorporated at any angle or oriented parallel or perpendicular to the lengthwise axis of the honeycomb structure. In a preferred embodiment of the invention the pitch based carbon fibers are angled relative to the lengthwise axis so as to provide additional mechanical strength to the thermally conductive structure. The resulting structures are strong, lightweight and exhibit a surprisingly high thermal conductivity.

While the heat transfer properties of such arrangements are a vast improvement over the prior art, structural considerations and manufacturing techniques impact the thermal characteristics of the honeycomb construct. For instance, in order to achieve honeycomb structures having maximum shear properties, the conductive fibers are preferably oriented with a 45° bias prior to performing the corrugation process. This undesirably increases the path length for heat transfer thereby increasing the insulating capacity of the honeycomb structure. Further, the process of weaving the brittle, thermally conductive fibers into the reinforcement can result in fiber breakage, thereby compromising the structural and thermal integrity of the resulting material. As with the increased path length, this introduction of fiber discontinuities raises the heat capacity of the honeycomb structure with a corresponding decrease in thermal transfer capability. In addition, the fabrication of the interwoven thermally conductive reinforcement fabric may undesirably complicate the production of the honeycomb structure by increasing the number of manufacturing steps along with the unit cost.

Accordingly it is an object of the present invention to provide strong, lightweight, non-metallic honeycomb structures which exhibit relatively high thermal conductivity.

It is another object of the present invention to provide an efficient, cost effective process for the fabrication of a strong, lightweight, thermally conductive non-metallic honeycomb structure.

It is yet another object of the present invention to overcome the aforementioned problems with the prior art techniques for forming a thermally conductive honeycomb structure.

It is still another object of the present invention to provide thermally conductive non-metallic honeycomb structures for use in applications where the transfer of thermal energy is necessary, such as in aircraft engine structures.

SUMMARY OF THE INVENTION

Generally stated, the present invention accomplishes the aforementioned objectives by means of a co-corrugation process which can be used to fabricate thermally conductive non-metallic composite honeycomb structures. The honeycomb structures of the present invention consist of a plurality of multi-ply walls comprising thermally conductive unidirectional fibers and high strength reinforcement material. In addition to exhibiting a high degree of thermal transmission, the resultant honeycomb structures are strong and lightweight. Moreover, they incorporate all the benefits of non-metallic composite materials including fatigue endurance, design flexibility and corrosion resistance. Unlike prior art attempts where a substantial percentage of the relatively fragile thermally conductive fibers had a tendency to break while being woven directly into the reinforcement material, the present invention incorporates the thermally conductive fibers into the desired structure separately from the reinforcement material. This results in relatively fewer broken strands being integrated into the honeycomb walls, thereby markedly improving the heat transfer capability of the finished structure. Further, the honeycomb structures do not require the fabrication of custom reinforcement materials and are therefore more efficient to manufacture in terms of both cost and labor than prior art structures.

In accordance with the present invention a thermally conductive non-metallic composite honeycomb structure is provided which combines unidirectional fibers exhibiting high thermal conductivity with a strong reinforcement material having relatively low thermal conductivity. The invention also provides a novel manufacturing process for efficiently fabricating the thermally conductive honeycomb structures. This manufacturing process comprises the co-corrugation of at least two layers of preimpregnated material (prepreg) using conventional production techniques to provide a corrugated sheet. One of the co-corrugated layers is a prepreg incorporating unidirectional fibers having high thermal conductivity while the other is a prepreg incorporating the reinforcement material. The prepreg layers or plies are oriented in the corrugation apparatus so as to furnish the appropriate thermal and mechanical characteristics to the finished honeycomb structure. A plurality of these thermally conductive corrugated sheets are then aligned and joined using conventional curing or bonding techniques to form the desired honeycomb structure.

Other objects, features and advantages of the present invention will be apparent to those skilled in the art from a consideration of the following detailed description and preferred exemplary embodiments thereof.

DETAILED DESCRIPTION OF EXEMPLARY EMBODIMENTS

Figure 1:
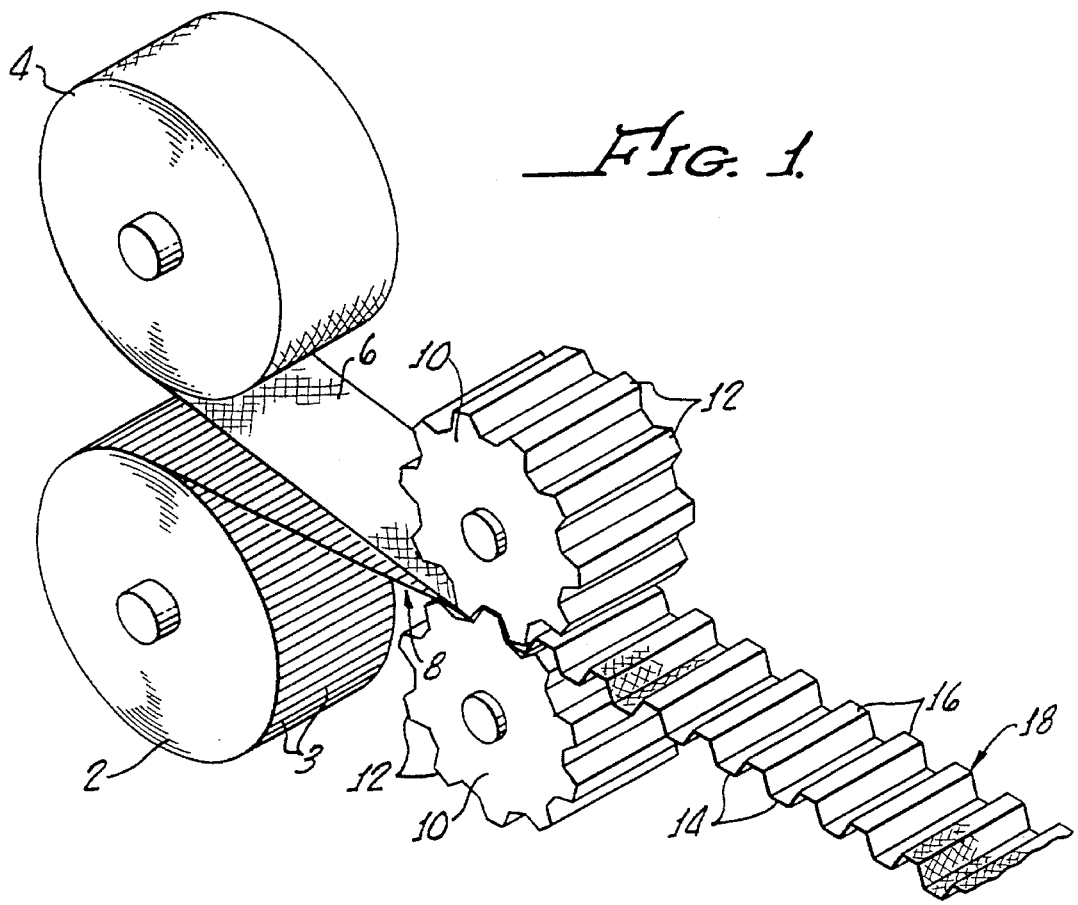
FIG. 1 depicts a preferred exemplary co-corrugation process and resulting thermally conductive corrugated sheet in accordance with the present invention wherein the unidirectional thermally conductive fibers are oriented in a direction parallel to the width of the formed sheet.

The invention provides non-metallic high thermal conductivity honeycomb structures wherein a plurality of interconnected walls define a plurality of interconnected honeycomb cells having a lengthwise direction which extends transversely relative to said walls and a thickness direction which extends parallel relative to the walls. These honeycomb walls comprise a laminate having at least one ply of non-metallic reinforcement material in combination with at least one ply comprising a plurality of unidirectional thermally conductive fibers. While the laminate of the honeycomb walls may simply comprise one ply of the reinforcement material and one ply of the thermally conductive unidirectional fibers, multi-ply configurations incorporating a plurality of each of the two materials may also be used to provide the desired characteristics. Following fabrication the individual plies of the honeycomb wall laminate are bound together through the adhesive characteristics of impregnated matrix materials.

As previously indicated, the non-metallic thermally conductive honeycomb structures of the invention are easily produced using a novel co-corrugation process which eliminates the need for specially fabricated thermally conductive woven fabric reinforcements. More particularly, the thermally conductive fibers are unidirectionally oriented in a separate prepreg rather than woven into a fabric reinforcement prior to matrix impregnation and corrugation. Accordingly, the manufacturing process of the present invention involves the co-corrugation of thermally conductive unidirectional fiber prepreg with reinforcement prepreg having the desired shear properties. The orientation of the unidirectional fiber prepreg, which may be in the form of tape, and the reinforcement material prepreg prior to corrugation is not critical and may be adjusted so as to provide the optimal thermal and mechanical properties in the finished honeycomb structure. Similarly, the method used to produce the co-corrugated sheet is not crucial and may involve any one of several conventional corrugation processes. For instance, the configured lay-up of unidirectional fiber prepreg and fabric reinforcement prepreg may be consolidated and co-corrugated using vacuum formation techniques, fixed die processing or roller die processing. Following the fabrication of the multi-ply corrugated sheets, a plurality of the sheets are aligned and attached, using techniques well known in the art, to produce a honeycomb structure having the desired thermal conductivity. The thermally conductive honeycomb structure may then be trimmed, shaped or otherwise formed to produce the finished part.

Depending on the desired characteristics, various types of material may be used for the individual components of the invention. For instance, fiber reinforcement prepregs useful in the invention include biased and unbiased fabric prepregs, knitted and stitched fabric prepregs as well as "powder coated" prepregs. The reinforcement material used to fabricate the prepreg can be in the form of woven fabrics, fibers, particles, mats or whiskers. Moreover, the impregnated reinforcement may be derived from any materials exhibiting the required shear properties including glass, aramid, carbon, graphite, boron and silicon carbide. In particular, the invention is well-suited for increasing the thermal conductivity of honeycomb structures which are made from resin impregnated polyacrylonitrile (PAN) based carbon fibers. Those skilled in the art will appreciate that, in addition, the different reinforcement materials and forms may be combined to tailor the characteristics of the resulting honeycomb structure.

In general, the aforementioned reinforcement fibers have relatively low thermal conductivity. For example, the thermal conductivity of PAN, glass and ceramic fibers is typically on the order of 100 watts/m° K or less. Non-metallic fibers having thermal conductivities in this range are usually considered to be relatively good insulating material by those skilled in the art. Moreover, the resin matrix in which these fibers are typically impregnated to fabricate composite structures also tend to have low thermal transfer characteristics so that conventional honeycomb structures generally have an overall thermal conductivity which falls within a relatively low range.

As with these conventional prior art reinforcements, most commercially available thermoplastic and thermoset resins are compatible with the present invention and may be used to form the unidirectional fiber prepreg and reinforced prepreg. For instance thermoset resins such as polyester resins, epoxy resins, polyether resins, polyurethane resins and the like are all compatible with the co-corrugation process described herein and, accordingly, are within the scope of the invention. Moreover, embodiments of the invention used in hostile environments may employ thermoset resins exhibiting high thermal and oxidative stability in the cured matrix. Exemplary materials having such properties include bismaleimides, maleimide-epoxy blends, phenolics, polyimides, polyquinoxalines, polyphenylquinoxalines and polybenzimidazoles. Other embodiments of the invention may use thermoset matrix materials having different advantages such as cost or ease of fabrication. Similarly, thermoplastic materials may be used to form the unidirectional fiber prepreg and the reinforcement prepreg prior to the formation of the co-corrugated assembly. Exemplary thermoplastic materials which are compatible for use in the invention include polyetherimides, acrylates, polysulfones, polyetheretherketones, polyurethanes, polycarbonates and the like. Further, it is important to note that it is not necessary to use the same resin for the matrix of the unidirectional fiber prepreg as is used for the reinforced prepreg. In any case, the ultimate choice of a matrix materials is based on a number of factors including the desired physical characteristics of the finished honeycomb structure, manufacturing considerations and cost constraints.

In accordance with the present invention, the above-described low thermal conductivity honeycomb structures are converted into high thermal conductivity honeycomb structures through the co-corrugation of high thermal conductivity fibers in the form of a unidirectional fiber prepreg. Preferably this unidirectional fiber prepreg is in the form of a tape. A number of materials may be used to fabricate the thermally conductive fibers, which are then unidirectionally embedded in thermoplastic or thermoset resins to form the desired prepreg. Due to cost considerations and manufacturing concerns, particularly preferred thermally conductive fibers for use in the present invention are pitch based carbon fibers. However, in addition to carbon fiber prepregs, unidirectional fiber prepregs incorporating thermally conductive boron, glass, quartz or sapphire fibers are compatible with the present invention.

All of these thermally conductive fibers have substantially higher heat transfer capabilities than do the non-conductive reinforcements. For example, commercially available pitch based carbon fibers have a high thermal conductivity which is typically on the order of 200 watts/m° K to about 1200 watts/m° K. Such fibers include those manufactured by AMOCO under the tradename THORNEL Carbon Fiber. In general, the individual pitch based carbon fibers have diameters on the order of approximately 10 μm and may be incorporated in the unidirectional prepreg in counts ranging from a few fibers per inch to hundreds of fibers per inch depending on the amount of heat transfer desired. Pitch based fibers identified as P120 are preferred with P75 fibers also being acceptable. Other high modulus, high conductivity pitched based fibers which may be used in the invention include those identified as K 1100, K 950, K 650 and the like. The pitch based carbon fibers, preferably in the form of a unidirectional tape, can be incorporated into the honeycomb structure in amounts ranging from about 1% by weight to about 90% by weight in order to provide the high thermal conductivity of the honeycomb structures of the present invention.

In addition to the use of different materials, variations in the relative orientation of the fibers are also contemplated as being within the scope of the present invention. More particularly, the reinforcement prepreg and unidirectional fiber prepreg may be oriented prior to co-corrugation so as to provide the desired heat transfer and mechanical properties to the finished honeycomb structure. Similarly, when several plies of either type of prepreg material are used to form the co-corrugated assembly, they may be oriented so the fibers run parallel to each other or offset so as to provide added strength or controlled heat transfer along more than one structural axis. It would, of course, also be possible to modify these characteristics by simply altering the number of thermally conducting layers or the number of reinforcement layers. Similarly, the properties of the thermally conductive honeycomb structure may be easily adjusted through various combinations of different reinforcements, matrix materials or thermally conductive fibers.

For example, the high thermal conductivity fibers may be oriented to extend substantially perpendicular to the thickness of the honeycomb structure to provide for the efficient transfer of heat transversely through the honeycomb. Conversely, the thermally conductive fibers may be oriented to extend substantially parallel to the thickness direction of the honeycomb thereby providing thermal transfer or conductance in this direction, i.e. essentially parallel to the cell walls of the honeycomb. Further, those skilled in the art will recognize that the fibers may also be aligned along an intermediate angle depending on the desired thermal properties of the finished part. More specifically, the high thermal conductivity fibers may be oriented to extend at an angle relative to the thickness of the honeycomb structure to provide added structural strength in addition to controlled heat transfer in both the parallel and transverse directions.

In one particularly useful embodiment of the invention a single plain weave fabric reinforcement prepreg is oriented so that its fibers extend at approximately 45° relative to the thickness of the finished honeycomb. At the same time, a single layer of prepreg tape, having thermally conductive unidirectional fibers, is laid-up so the fibers extend parallel to the thickness of the finished part prior to being co-corrugated. The orientation of the thermally conductive fibers allows the most efficient heat transfer through the structure while the angle of the fibers in the reinforcement fabric provides the maximum shear strength for the weight of the honeycomb. More specifically this construction provides a honeycomb web which has high thermal conductivity fibers oriented with the shortest path length from one honeycomb face to the other thereby allowing maximum dissipation of heat across the structure.

Turning now to the drawing FIGS. FIG. 1 illustrates the roller die fabrication of a thermally conductive corrugated laminate sheet in accordance with the teachings of the present invention. Unidirectional thermally conductive prepreg tape is provided in a roll 2 along with a roll of fabric reinforcement prepreg 4. The unidirectional thermally conductive fibers 3 are oriented perpendicular to the length of the tape. Unlike weaving the thermally conductive fibers directly into the fabric reinforcement, the use of unidirectional tape largely preserves the unbroken state of the thermally conductive fibers throughout the manufacturing process. As previously discussed, the fabric reinforcement prepreg may incorporate thermoplastic or thermoset materials and any one of a number of fabric reinforcements. The sheet of fabric reinforced prepreg 6 is drawn off roll 4 and contacted with the sheet of unidirectional thermally conductive tape 8 using rollers (not shown) or other techniques well known in the art to form a consolidated sheet. The unidirectional thermally conductive fibers remain oriented perpendicular to the length of the consolidated sheet.

The consolidated sheet of reinforced prepreg material and unidirectional thermally conductive tape is then passed between a pair of corrugating rollers 10 having mated teeth 12 which apply pressure to form the corrugated laminate sheet 18 exhibiting the desired pattern. When thermoplastic materials are used in the prepreg, the rollers 10 may be heated to soften the resin while shaping the consolidated sheet. Whether thermoplastic resins or thermoset materials are used, the pressure applied by the corrugating rollers 10 assures that the unidirectional thermally conductive prepreg tape 8 will be firmly attached to the reinforced prepreg 6. In the example illustrated, the corrugated sheet 18 exhibits a substantially sinusoidal pattern of alternating nodes 14 and antinodes 16. Upon exiting the corrugating rollers 10, the corrugated sheet 18 may be sized and cut to the desired dimensions.

Figure 2:
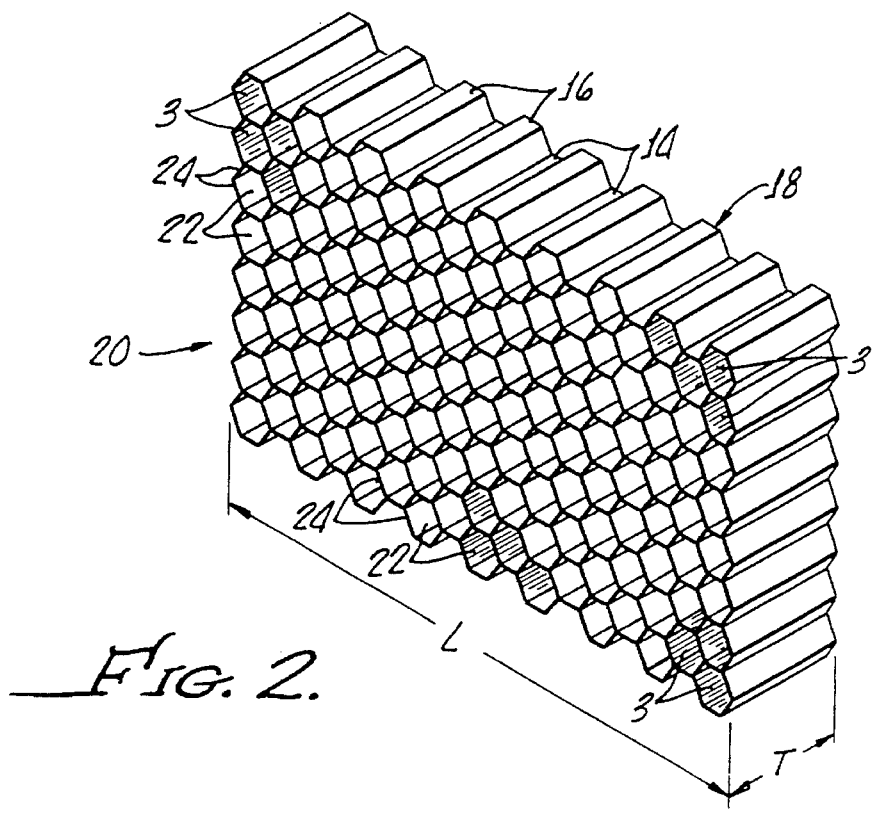
FIG. 2 is a detailed view of a completed thermally conductive honeycomb structure fabricated in accordance with the teachings of the present invention in which the unidirectional thermally conductive fibers are oriented in a direction parallel to the thickness of the honeycomb structure.

As previously discussed, a number of the corrugated laminate sheets 18 are attached to produce the corrugated panel 20 shown in FIG. 2. More particularly, the corrugated laminate sheets 18 are stacked with the antinodes 16 of a lower layer in contact with the nodes 14 of the sheet immediately above. The nodes and antinodes are then bonded to one another through adhesive or, if a thermoplastic resin prepreg was employed, through melt bonding. Similarly, if thermoset resins were used, the bonding could be accomplished by completely curing the formed sheets while they are in contact.

Basic cell shapes of honeycomb structures include hexagonal, over-expanded, and flex-core. Hexagonal is the most common cell type and, accordingly, will be the principal configuration used to illustrate the features of the present invention. However, other configurations such as over-expanded and flex-core are used when the honeycomb structure is to be formed into cylinder shape or configured with a compound curve. Still other honeycomb configurations such as a "reinforced core" or "tube core" may also be fabricated using the co-corrugation process of the present invention. Accordingly, any honeycomb cell structure which may be fabricated using the co-corrugation process disclosed herein is considered to be within the scope of the invention.

FIG. 2 shows an exemplary corrugated panel 20 comprising a plurality of hexagonal honeycomb cells 22 having walls 24 defined by the corrugations of laminate sheets 18. The honeycomb structure 20 has a lengthwise direction which extends transversely relative to the honeycomb cells 22 and is represented by L in FIG. 2. The honeycomb structure also has a thickness direction which extends parallel relative to the honeycomb cells 22 and is represented by T in FIG. 2. In this example, the cells 22 in FIG. 2 are hexagonal and defined by six cell walls 24. However, those skilled in the art will appreciate that shape of the cells is determined by the corrugation pattern which may be altered to produce any cellular structure having the desired physical properties.

FIG. 2 also shows unidirectional thermally conductive fibers 3 incorporated within the cell walls 24 of the honeycomb cells 22. In accordance with the present invention, a plurality of the thermally conductive fibers are substantially impregnated in a resin matrix so that they extend in the thickness direction T. The orientation of the thermally conductive fibers 3 essentially parallel to the thickness of the honeycomb structure provides for increased thermal conductance through the honeycomb structure along the T axis.

Figure 3:
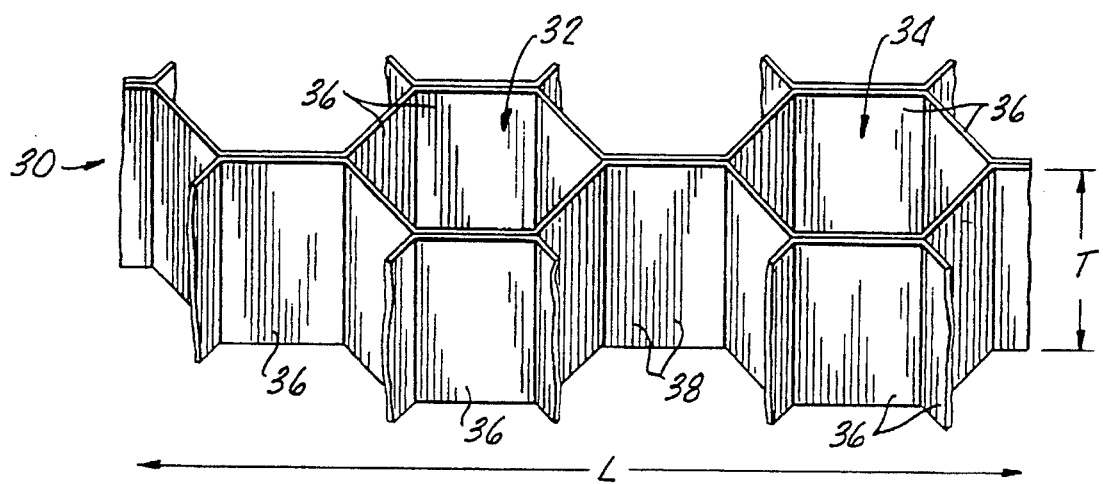
FIG. 3 is a perspective view of a preferred exemplary honeycomb structure formed in accordance with the present invention wherein the unidirectional thermally conductive fibers are oriented in a direction parallel to the thickness of the honeycomb structure to provide increased thermal conductivity through the structure.

FIG. 3 shows a small portion of a preferred exemplary embodiment of a honeycomb structure 30 fabricated according to the teachings of the present invention. In FIG. 3 the honeycomb structure 30 contains two complete honeycomb cells 32 and 34 along with portions of several cells that have been cut away to show their structure. As is well known, honeycomb structures typically include hundreds, if not thousands, of such interconnected honeycomb cells. For purposes of illustration, only the two complete cells are shown, with it being understood that the remainder of the interconnected honeycomb cells which typically make up the honeycomb structure are not shown.

In FIG. 3 the honeycomb cells 32 and 34 are formed of a plurality of interconnected cell walls 36. The interconnected cell walls are fabricated using non-metallic reinforced prepreg and unidirectional thermally conductive prepreg in accordance with the teachings of the present invention. As with FIG. 2, the honeycomb structure 30 has a lengthwise direction oriented transversely to interconnected cells 32 and 34 and represented by L in FIG. 3. The honeycomb structure 30 also has a thickness, represented by T in FIG. 3, substantially parallel to the interconnected cells 32 and 34.

FIG. 3 also illustrates the unidirectional pattern of high thermal conductivity fibers 38 incorporated in the interconnected cell walls 36 of the honeycomb structure 30. In this exemplary embodiment, as with the embodiment illustrated in FIG. 2, the thermally conductive fibers 38 are oriented in a direction parallel to the thickness of the honeycomb structure. Accordingly, a honeycomb structure represented by FIG. 3 would provide increased thermal conductance through the honeycomb along the T axis.

As the cells 32 and 34 are fabricated using unidirectional thermally conductive prepreg, the thermally conductive fibers 38 are uniformly distributed in each of the honeycomb cell walls 36 thereby allowing optimum heat dispersal. Accordingly, the rate of directed heat transfer will depend largely on the number of thermally conductive fibers incorporated per cell wall 36, the type of thermally conductive fiber used and the continuity of the fibers. However, as the thermally conductive fibers generally remain unbroken during the co-corrugation process of the present invention, the amount of heat transfer is predictable and readily adjusted by simply varying the type and amount of fiber used in the unidirectional fiber prepreg.

Figure 4:
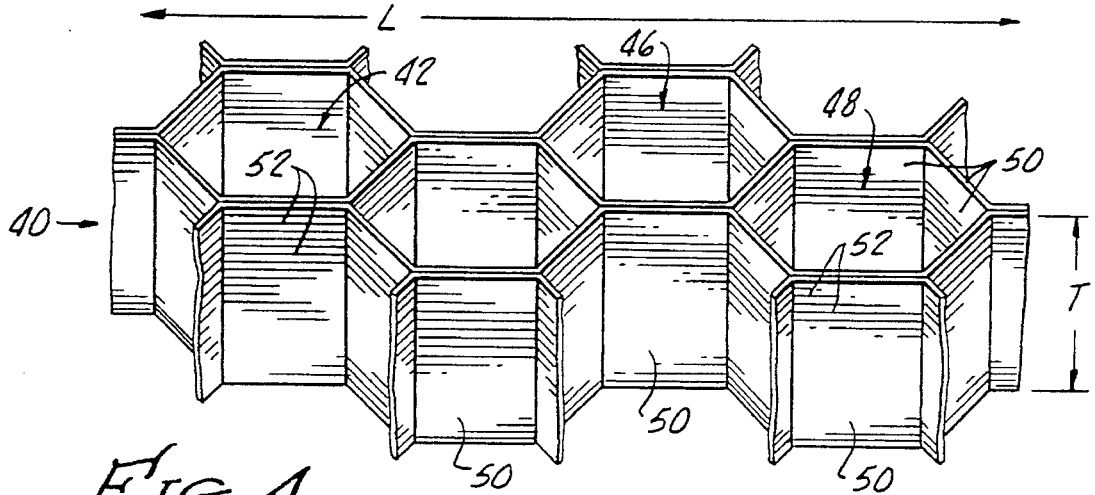
FIG. 4 is a perspective view of a second preferred exemplary embodiment in accordance with the teachings of the present invention wherein the unidirectional thermally conductive fibers are oriented in a direction perpendicular to the thickness of the honeycomb structure to provide increased thermal conductivity along the structure.

Another preferred honeycomb structure is shown in FIG 4. As with FIG. 3, only a few cells 42, 44, 46 and 48 of a much larger honeycomb structure are shown with a lengthwise direction oriented transversely to the interconnected cells and represented by L in FIG. 4. The honeycomb structure 40 also has a thickness, represented by T in FIG. 4, substantially parallel to the interconnected cells. More particularly, the honeycomb structure 40 is substantially the same as the non-metallic honeycomb structure 30 shown in FIG. 3 except that the unidirectional thermally conductive fibers 52 are oriented in a direction perpendicular to the thickness of the honeycomb structure 40. In this embodiment, heat transfer through the honeycomb structure 40 will be optimized along the L axis or perpendicular to the cells 42, 44, 46, and 48. While the path of the thermally conductive fibers in this direction may not be as direct as the path parallel to the thickness of the structure, the thermal characteristics of the fibers still ensure efficient heat transfer along the L axis.

As is apparent from the structures shown in FIGS. 2, 3 and 4, the present invention provides the capacity to control heat conductance through honeycomb structures in either the parallel or perpendicular directions relative to the thickness of the structure. Moreover, the unidirectional thermally conductive fibers may be oriented at discrete angles between the parallel or perpendicular directions. For example, one preferred embodiment envisions thermally conductive fibers which are oriented at angles of plus or minus 45° relative to the thickness of the honeycomb structure. Other preferred embodiments incorporate the unidirectional thermally conductive fibers at angles ranging from 30° to 60° relative to the thickness providing a variety of different combinations of mechanical strengths and thermal transfer properties in the honeycomb. In any case, the transferability of heat through the resultant honeycomb structure is easily adjusted during the co-corrugation process by altering the orientation of the unidirectional thermally conductive fibers.

As previously discussed, it is also possible to alter the physical and thermal properties of the honeycomb structures by varying the number of plys used to fabricate the corrugated laminate sheets of the present invention. More than one ply of reinforced prepreg may be combined and co-corrugated with one or more plys of unidirectional thermally conductive prepreg. This is easily accomplished during the co-corrugation manufacturing process by laying up and consolidating a plurality of plies in any combination or order prior to forming the corrugated laminate sheet. Further, the different plies may be oriented at different angles to provide increased strength or generate specific thermal conductance patterns. While slightly heavier, the resulting honeycomb structures will be stronger and allow more subtle adjustment of heat distribution.

Figure 5:
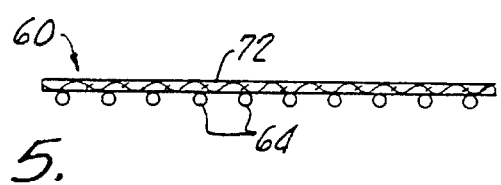
FIG. 5 is a cross-section of a portion of the honeycomb wall fabricated as shown in FIG. 1 illustrating the position of the unidirectional thermally conductive fibers with respect to the reinforcement fabric.
Figure 6:
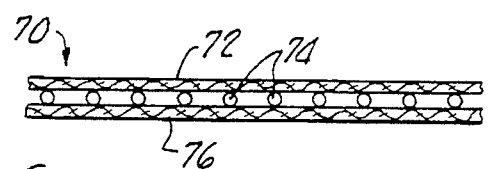
FIG. 6 is a cross-section of a portion of a honeycomb wall fabricated in accordance with the teachings of the present invention showing the position of two individual plies of reinforcement fabric with respect to incorporated unidirectional thermally conductive fibers.

Two preferred configurations of the corrugated laminate sheets of the present invention are illustrated in FIG. 5 and FIG. 6. More specifically, FIG. 5 shows the cross section of a laminated structure 60, corresponding to a honeycomb cell wall, formed using a single ply of reinforced prepreg and a single ply of unidirectional thermally conductive tape. In this exemplary embodiment, the reinforcement material 62 is adjacent to the unidirectional thermally conductive fibers 64 which have, to some extent, been uniformly impregnated in a resin matrix. Such a configuration could be fabricated using the co-corrugation process illustrated in FIG. 1. FIG. 6, on the other hand, shows the cross section of a preferred embodiment of the invention having a plurality of reinforced prepreg layers. More particularly, the cross section of a laminated structure 70, again corresponding to a honeycomb cell wall, was formed using one ply of unidirectional thermally conductive prepreg sandwiched between two plies of reinforced prepreg prior to co-corrugating the consolidated sheet. Laminated structure 70 comprises the upper reinforcement ply 72 and lower reinforcement ply 76 surrounding a plurality of unidirectional thermally conductive fibers 74.

A further understanding of the invention may be obtained by considering the following non-limiting example:

EXAMPLE I

A honeycomb structure having the hexagonal cell configuration illustrated in FIG. 2 was fabricated using the co-corrugation process shown in FIG. 1. The reinforcement materials and thermally conductive fibers had the specifications set forth in Table 1.

TABLE 1

|  | VALUE |
|---|---|
| REINFORCEMENT SPECIFICATION | |
| FIBER TYPE | |
| WARP | T300 1K |
| FILL | T300 1K |
| FABRIC CONSTRUCTION | PLAIN WEAVE |
| YARN COUNT | |
| WARP (PER INCH) | 16 |
| FILL (PER INCH) | 16 |
| FABRIC AREAL WEIGHT (CALC.) | |
| $G/M^2$ | 85 |
| $OZ/YD^2$ | 2.5 |
| RESIN SYSTEM | F175 (POLYIMIDE) |
| UNIDIRECTIONAL TAPE | |
| FIBER TYPE | P120 |
| COUNT (PER INCH) | 8.5 |
| TAPE AREAL WEIGHT (CALC.) | |
| $G/M^2$ | 110 |
| RESIN SYSTEM | F584 (EPOXY) |
| FIBER CONCENTRATION | 65 wt % |

The T300 polyacrylnitrile base carbon fibers were obtained from Toray and woven into a plain weave fabric. The resulting fabric was impregnated with 35% by weight F175 polyimide resin using techniques well known in the art. Similarly, the P120 pitch based carbon fibers were obtained from AMOCO and unidirectionally impregnated in a prepreg tape having F584 epoxy resin using conventional fabrication techniques. The unidirectional prepreg tape had a fiber count of approximately 8.5 fibers per inch providing a concentration of 36.7% by weight of thermally conductive fibers in the finished structure. The two prepregs were partially cured and then co-corrugated using commercially available equipment to form corrugated laminate sheets as shown in FIG. 1. The corrugated laminate sheets were then aligned and, after adhesive was applied to the contact surfaces, bonded by fully curing the resin to produce a honeycomb structure as shown in FIG. 2. The resulting honeycomb structure had significantly higher thermal conductivity in the thickness direction than did a honeycomb structure fabricated without thermally conductive fibers. Further, the strength of the two honeycomb structures was substantially equivalent.

Those skilled in the art will further appreciate that the present invention may be embodied in other specific forms without departing from the spirit or central attributes thereof. In that the foregoing description of the present invention discloses only exemplary embodiments thereof, it is to be understood that other variations are contemplated as being within the scope of the present invention. Accordingly, the present invention is not limited to the particular embodiments which have been described in detail herein. Rather, reference should be made to the appended claims to define the scope and content of the present invention.

What is claimed is:

1. A high thermal conductivity non-metallic honeycomb structure comprising:
    a plurality of interconnected walls which define a plurality of interconnected honeycomb cells having a lengthwise direction which extends transversely relative to said walls and a thickness direction which extends parallel relative to said walls, said cell walls comprising:
        at least one reinforcement layer having low thermal conductivity, said reinforcement layer comprising a plurality of non-metallic fibers having low thermal conductivity and a resin matrix in which said low thermal conductivity fibers are impregnated; and
        at least one thermal conductance layer, said thermal conductance layer comprising a plurality of non-metallic fibers having high thermal conductivity and a resin matrix in which said high thermal conductivity fibers are impregnated, said high thermal conductivity fibers being oriented in said thermal conductance layer to provide directionally controlled heat conductance through said honeycomb structure.

2. A high thermal conductivity non-metallic honeycomb structure according to claim 1 wherein said high thermal conductivity fibers are oriented unidirectionally.

3. A high thermal conductivity non-metallic honeycomb structure according to claim 1 wherein said high thermal conductivity fibers are unidirectionally oriented in a direction parallel to said thickness direction of said honeycomb walls.

4. A high thermal conductivity non-metallic honeycomb structure according to claim 1 wherein said high thermal conductivity fibers are unidirectionally oriented in a direction parallel to said lengthwise direction of said honeycomb walls.

5. A high thermal conductivity non-metallic honeycomb structure according to claim 1 wherein said walls comprise a thermal conductance layer located between two reinforcement layers.

6. A high thermal conductivity non-metallic honeycomb structure according to claim 1 wherein said low thermal conductivity non-metallic fibers in said reinforcement layer are selected from the group consisting of glass fibers, ceramic fibers and polyacrylonitrile based carbon fibers.

7. A high thermal conductivity non-metallic honeycomb structure according to claim 1 wherein said high thermal conductivity non-metallic fibers in said thermal conductance layer are selected from the group consisting of pitch based carbon fibers.

* * * * *